United States Patent [19]

Cantiani

[11] Patent Number: 5,534,175
[45] Date of Patent: Jul. 9, 1996

[54] COPOLYMERS OF UNSATURATED FATTY ESTERS, THEIR USE AS VISCOSITY IMPROVER AND LUBRICATING OIL CONTAINING SAID COPOLYMERS

[75] Inventor: Robert Cantiani, Puteaux, France

[73] Assignee: The Lubrizol Corporation, Wickliffe, Ohio

[21] Appl. No.: 295,696

[22] PCT Filed: Dec. 22, 1993

[86] PCT No.: PCT/US93/12528

§ 371 Date: Nov. 11, 1994

§ 102(e) Date: Nov. 11, 1994

[87] PCT Pub. No.: WO94/14860

PCT Pub. Date: Jul. 7, 1994

[30] Foreign Application Priority Data

Dec. 28, 1992 [FR] France ..................... 92/15780

[51] Int. Cl.$^6$ ..................... C10M 145/14; C08F 220/18
[52] U.S. Cl. ........................... 508/469; 526/328
[58] Field of Search .................... 252/56 R; 526/328

[56] References Cited

U.S. PATENT DOCUMENTS

| | | | |
|---|---|---|---|
| 4,756,843 | 7/1988 | Jarrin et al. | 252/56 R |
| 4,822,508 | 4/1989 | Pennewiss et al. | 252/56 R |
| 4,968,444 | 11/1990 | Knoell et al. | 252/56 R |
| 5,043,087 | 8/1991 | Pennewiss et al. | 252/56 R |
| 5,349,019 | 9/1994 | Wirtz et al. | 252/56 R |
| 5,368,761 | 11/1994 | Gore et al. | 252/56 R |
| 5,416,162 | 5/1995 | Gore et al. | 252/56 R |

*Primary Examiner*—Jacqueline V. Howard
*Attorney, Agent, or Firm*—Joseph P. Fischer; Frederick D. Hunter; James L. Cordek

[57] ABSTRACT

Copolymers of unsaturated fatty esters capable of being obtained by copolymerization in a mineral oil of a percentage a) of an ester of a carboxylic acid $A_1$, of a percentage b) of an ester of a carboxylic acid $A_2$ and a percentage c) of an ester of a carboxylic acid $A_3$, wherein a), is between 12 and 20%, c) is between 14 and 30% and b), which is preferably 72 and 45%, is such that a)+b)+c)=100%. The copolymers in accordance with the invention are reemployed as viscosity improver in lubricating oils.

23 Claims, No Drawings

COPOLYMERS OF UNSATURATED FATTY ESTERS, THEIR USE AS VISCOSITY IMPROVER AND LUBRICATING OIL CONTAINING SAID COPOLYMERS

FIELD OF THE INVENTION

The invention relates to copolymers of unsaturated fatty esters.

It also relates to the use of these copolymers as viscosity improvers for lubricating oils at high temperatures without adversely affecting viscosity at low temperatures.

Finally, it relates to a composition which is based on the above-mentioned copolymers and which is intended to be incorporated into lubricating oils, as well as to the lubricating oils comprising said copolymers or said composition.

BACKGROUND OF THE INVENTION

The lubricating oils in question within the scope of the present invention consist essentially of naphthenic hydrocarbons and paraffinic hydrocarbons and their mixtures, the kinematic viscosity of these oils at 100° C. being between about 1 and about 20 and, preferably between about 2 and about 10 mm²/s.

There are already known copolymers of the kind in question which can be employed as multipurpose agents and especially as viscosity improvers in lubricating oils.

It is found, however, that, as oil manufacturers' requirements become increasingly constraining, copolymers which are already known no longer meet the requirements of practice, especially in their applications in so-called top-grade oils or in the case of highly specialized uses.

In addition, the multitude of factors that affect the properties of the above-mentioned copolymers and the large number of possible combinations of these factors mean that the search for copolymers capable of imparting ever better properties to lubricating oils, especially in respect of their viscosity, becomes increasingly difficult.

DETAILED DESCRIPTION OF THE INVENTION

It is therefore surprising to successfully prepare copolymers capable of imparting to formulations based on lubricating oils a kinematic viscosity which is satisfactory not only at high temperature, particularly at 100° C., but also at low, or even very low temperature, 40° C. and at temperatures reaching and even going beyond −30° C., this viscosity satisfying conditions are at least equal to those of the ISO Classifications VG 32 which defines an industrial fluid lubricant having a midpoint viscosity 32 centistokes (mm²/s) at 40° C. and kinematic viscosity between 28.8 and 35.2 centistokes at 40° C., described in the standards ISO 34-48 or NF T60-141, and in ASTM Standard D-2422, the measurements being carried out according to ASTM Procedure D 445, Standard Test Method for Kinematic Viscosity of Transparent and Opaque Liquids. ASTM D-445 covers the determination of the kinematic viscosity of liquid petroleum products by measuring the time for a volume of liquid to flow under gravity through a calibrated glass capillary viscometer.

This procedure is given in the Annual Book of ASTM Standards which is published annually by ASTM, Philadelphia, Pa. 19103 USA.

SUMMARY OF THE INVENTION

The copolymers in accordance with the invention, which are copolymers of unsaturated fatty esters capable of being obtained by copolymerization, conveniently in an organic diluent, preferably in a mineral oil of a percentage a (expressed on mass basis) of an ester of a carboxylic acid $A_1$ containing from 3 to 5 carbon atoms and exhibits an ethylenic unsaturation alpha to the carboxylic functional group, with an alcohol, preferably a saturated alcohol, of formula $R_1OH$ containing from 1 to 3 carbon atoms, preferably 1 or 2 carbon atoms, said alcohol being advantageously methyl alcohol, of a percentage b (expressed on mass basis) of an ester of a carboxylic acid $A_2$ containing from 3 to 5 carbon atoms and exhibits an ethylenic unsaturation alpha to the carboxylic functional group, with an alcohol, preferably a saturated alcohol, of formula $R_2OH$ containing an average from 11 to 15 carbon atoms, preferably from 12 to 14 carbon atoms, said alcohol being advantageously lauryl alcohol, of a percentage c (expressed on mass basis) of an ester of a carboxylic acid $A_3$ containing from 3 to 5 carbon atoms and exhibiting an ethylenic unsaturation alpha to the carboxylic functional group, with an alcohol, preferably a saturated alcohol, of formula $R_3OH$ containing an average from 16 to 25 carbon atoms, preferably from 16 to 20 carbon atoms and, still more preferably, from 16 to 18 carbon atoms, said alcohol being advantageously cetyl alcohol, in which a is between about 12 and about 20%, c is between about 14 and about 30% and b, which is between about 72 and about 45% is such that a+b+c=100%.

For purposes of this invention, the term "lauryl alcohol" is defined as an alcohol mixture containing $C_{11}$ to $C_{16}$ alcohols, having a distribution of less than about a total of 3% by weight $C_{11}$ or lower and $C_{16}$ or greater, about 20% $C_{12}$, about 30% each $C_{13}$ and $C_{14}$ and about 20% $C_{15}$, wherein the total is 100%. These have a mixture of linear and branched alkyl groups.

For purposes of this invention, the term "cetyl alcohol" is defined as an alcohol containing $C_{14}$ to $C_{20}$ alcohols, having a distribution of less than about total of 6% of $C_{14}$ or lower and $C_{20}$ and greater, about 35–40% $C_{16}$ and about 60% of $C_{18}$ alcohols, with the total being 100%. These usually have an even number of carbon atoms and the alkyl groups are primarily linear.

Sources of these alcohols include Alcool Gras 16/18 (Condea), Dobanol 125L (Shell) and Alchem 125 (Erichem).

According to an advantageous embodiment the copolymers in accordance with the invention have a weight-average molecular mass ($\overline{M}w$) of between about 70,000 and about 90,000 g/mole, preferably between about 80,000 and about 85,000 g/mole, and exhibit a polydispersity value $\overline{M}w/\overline{M}n$ (ratio of the value of the weight-average molecular mass to the value of the number-average molecular mass) of between about 2 and about 5, preferably between about 2 and about 3.

When the oil which is to be treated is at least partially naphthenic, a is between about 12 and about 20%, preferably between about 13 and about 18% and still more preferably between about 14 and about 17%, c is between about 14 and about 25%, preferably between about 15 and about 24% and still more preferably between about 16.5 and about 23.5% and b, which is between about 72 and about 45% is such that a+b+c= 100%.

When the oil to be treated is a paraffinic oil c and b are between about 14 and about 30% and between about 72 and about 53% respectively, a being as defined above with a+b+c=100%.

The acids $A_1$, $A_2$ and $A_3$ may be different from one another but are preferably identical; they may consist of mixtures, but are preferably substantially pure.

The acids $A_1$, $A_2$ and $A_3$ have advantageously 3 or 4 carbon atoms, methacrylic acid being preferred.

The radicals $R_1$, $R_2$ and $R_3$ may be pure or may consist of mixtures, it being understood that, preferably:

in the case of $R_1$ the quantity of propanol or of heavier alcohol does not exceed 10%, preferably 5% and, still more preferably 2%, by weight, in the case of $R_3$ the quantity of alcohol(s) not containing 11 to 15 carbon atoms does not exceed 10%, preferably 5% and, still more preferably, 2% by weight, in the case of $R_3$ the quantity of alcohol(s) not containing 15 to 25 carbon atoms does not exceed 10%, preferably 5% and, still more preferably, 2% by weight.

The radicals $R_1$, $R_2$ and $R_3$ are advantageously linear and, in any event, their branching content is lower than 50%, preferably lower than 25%.

The copolymers in accordance with the invention may be employed as they are as viscosity improvers for the lubricating oils in question, the quantity of copolymers used corresponding to a proportion of about 2 to about 20%, preferably from about 5 to about 15% and, still more preferably, of about 7 to about 11% by weight of the mass of lubricating oil to be treated.

It is convenient, however, to use them in the form of a composition comprising the copolymers of this invention with a normally liquid organic diluent, preferably mineral oil, forming the reaction medium within which the copolymerization is performed. The mineral oil may be the same as the lubricating oil which is to be treated. The composition in accordance with the invention normally comprises from about 25 to about 75%, preferably from about 40 to about 75% by weight of at least one copolymer in accordance with the invention, the remainder to 100% consisting essentially of a normally liquid organic diluent, preferably mineral oil.

The oils to be treated with the copolymers of this invention are oils of lubricating viscosity, including natural or synthetic lubricating oils and mixtures thereof. Natural oils include animal oils, vegetable oils, mineral oils, solvent or acid treated mineral oils, and oils derived from coal or shale. Synthetic lubricating oils include hydrocarbon oils, halo-substituted hydrocarbon oils, alkylene oxide polymers, esters of carboxylic acids and polyols, esters of polycarboxylic acids and alcohols, esters, of phosphorus-containing acids, polymeric tetrahydrofurans, silicone-based oils and mixtures thereof.

Specific examples of oils of lubricating viscosity are described in U.S. Pat. No. 4,326,972 and European Patent Publication 107,282, both herein incorporated by reference for their disclosures relating to lubricating oils. A basic, brief description of lubricant base oils appears in an article by D. V. Brock, "Lubricant Base Oils", Lubricant Engineering, volume 43, pages 184–185, March, 1987. This article is herein incorporated by reference for its disclosures relating to lubricating oils. A description of oils of lubricating viscosity occurs in U.S. Pat. No. 4,582,618 (Davis) (column 2, line 37 through column 3, line 63, inclusive), herein incorporated by reference for its disclosure to oils of lubricating viscosity.

The lubricating oil in accordance with the invention is one which comprises at least one copolymer in accordance with the invention in a proportion of from about 2 to about 20%, preferably from about 5 to about 15% and, still more preferably, from about 7 to about 11% by weight of the mass of lubricating oil to be treated.

The conventional methods of radical copolymerization in solution in organic diluent, preferably oil, can be used to prepare the copolymer in accordance with the invention.

Such methods are described in the work "Encyclopedia of Polymer Science and Engineering" (H. F. Mark, N. M. Bikales, C. G. Overberger and G. Menges), 2nd edition (1988), published by Wiley Interscience.

These methods include free-radical initiated polymerization employing azo compounds or peroxides. Also described therein are photochemical and radiation initiated methods.

Useful initiators include organic peroxides, hydroperoxides and azo compounds.

Polymerization of acrylic and methacrylic monomers can take place under a variety of conditions, among which are bulk polymerization, solution polymerization, usually in an organic solvent, preferably mineral oil, emulsion polymerization, suspension polymerization and nonaqueous dispersion techniques.

Solution polymerization is preferred, especially in mineral oil diluent. This method is preferred for preparing polymers having molecular weights in the range of from about 2000 to about 200,000.

Molecular weights of the polymers can be controlled employing a number of techniques including choice of initiator, reaction temperature, concentration of monomers and initiator and solvent type. Chain transfer agents can be used.

Molecular weights can be determined employing standard analytical methods such as gel permeation chromatography (GPC) using a polystyrene standard.

Ionic polymerization techniques are known including cationic and anionic methods; however, cationic methods are generally ineffective for acrylate and methacrylate monomer polymerization.

Free radical initiation is preferred.

Because acrylic polymerizations are usually accompanied by liberation of considerable heat, care must be taken to avoid uncontrolled reaction. Temperatures can be controlled by using reactors with cooling jackets, controlling rates of addition and reaction solvents.

A typical procedure for preparing the polymers of this invention is to charge at room-temperature about one third of the monomers, diluent, chain transfer agent and a portion of a peroxide initiator. The mixture is heated to about 125° C. at which time heating is discontinued and the temperature is allowed to rise exothermically, moderated with cold water cooling, to about 142° C. At this temperature, the remaining two-thirds of monomer additional oil, chain transfer agent and a portion of initiator are added over about 1.5 hours. During this time cold water cooling is applied until the temperature drops to about 130° C. at which external cooling is discontinued. The temperature then continues to drop until at the end of the 1.5 hour addition period, the temperature is about 125° C. After monomer addition is completed the materials are held at 125° C. for 0.5 hours, then four additional portions of initiator are added at hourly intervals. After the final addition of initiator, the reaction mixture is held at 125° C. for 1 hour then diluted with oil to final concentration and filtered.

These methods were employed to prepare, on the one hand, 9 copolymers in accordance with the invention and, for the purpose of comparison, 8 copolymers in which the proportions a, b and c do not correspond to those which the copolymers in accordance with the invention must have.

For the preparation of these 17 copolymers methacrylic acid was employed as acid and, as alcohol:
  methyl alcohol for the copolymer based on $R_1OH$.
  lauryl alcohol for the copolymer based on $R_2OH$.
  cetyl alcohol for the copolymer based on $R_3OH$.
The proportions
  a% of ester E1 of methacrylic acid and of methyl alcohol
  b% of ester E2 of methacrylic acid and of lauryl alcohol and
  c% of ester E3 of methacrylic acid and of cetyl alcohol are shown below, in Table 1, for each of these copolymers (it being stated whether it is a copolymer in accordance with the invention or a copolymer studied by way of comparison).

Each of copolymer compositions 1–17 contains about 49.6% polymer in the diluent, which diluent is mineral oil, a paraffonic oil, 175N.

TABLE I

| Copolymer No. | PROPORTIONS IN % BY WEIGHT OF ESTER | | |
|---|---|---|---|
| | E1 (a%) | E2 (b%) | E3 (c%) |
| 1 (comparison) | 8 | 88 | 4 |
| 2 (comparison) | 32 | 64 | 4 |
| 3 (comparison) | 8 | 64 | 28 |
| 4 (invention) | 16 | 64 | 20 |
| 5 (invention) | 16 | 64 | 20 |
| 6 (comparison) | 12 | 60 | 28 |
| 7 (invention) | 16 | 60 | 24 |
| 8 (invention) | 12 | 64 | 24 |
| 9 (comparison) | 12 | 74 | 14 |
| 10 (comparison) | 15 | 75 | 10 |
| 11 (comparison) | 8 | 88 | 4 |
| 12 (comparison) | 32 | 64 | 4 |
| 13 (invention) | 16 | 64 | 20 |
| 14 (invention) | 16 | 64 | 20 |
| 15 (invention) | 20 | 60 | 20 |
| 16 (invention) | 12 | 60 | 28 |
| 17 (invention) | 16 | 60 | 24 |

Note: Copolymer 6, having "c"=28, meets requirements for polymers of this invention. It is indicated as comparison because it was evaluated in oil $O_2$, a naphthenic oil, in which polymers having a maximum 'c' of 25 are permitted.

The effect exerted on the viscosity of lubricating oils by the above-mentioned copolymers was studied in comparison with three lubricating oils $O_1$, $O_2$ and $O_3$, respectively.

The first of these oils, namely oil $O_1$, consists of a mixture comprising about 60% by volume of a first essentially paraffinic oil (batch one) marketed by the Shell Company under the name "HVI60" and about 40% by volume of an essentially naphthenic oil marketed by the Shell Company under the name "MV1N40".

The second of these oils, namely oil $O_2$, consists of a mixture comprising about 60% by volume of a second essentially paraffinic oil (batch two) marketed by the Shell Company under the name "HVI60" and about 40% by volume of the same essentially naphthenic oil (same batch) marketed by the Shell Company under the name "MVIN40".

The third of these oils, namely oil $O_3$, is a paraffinic oil marketed by the British Petroleum Company under the name "150N".

In Table II below are shown some of the values at 40° C. and at 100° C. of the kinematic viscosities of the above-mentioned oils and of their constituents together with the values, for the same products, of the quantities VIE or "Viscosity Index Extension" defined in ASTM standard D2270 entitled Standard Practice for Calculating Viscosity Index from Kinematic Viscosity at 40° C. and 100° C. and consisting of an arbitrary number employed to characterize the variation of the kinematic viscosity of a petroleum product with temperature.

TABLE II

| | Viscosity (mm²/s) | | | | | |
|---|---|---|---|---|---|---|
| | HV160 (batch 1) | HV160 (batch 2) | MVIN40 | $O_1$ | $O_2$ | $O_3$ |
| 40° C. | 27.0 | 24.7 | 8.6 | 17.10 | 16.26 | 31.0 |
| 100° C. | 5.01 | 4.75 | 2.35 | 3.70 | 3.58 | 5.2 |
| VIE | 112 | 112 | 82 | 101 | 100 | 96 |

Measurements were then carried out of the kinematic viscosity of the oils $O_1$, $O_2$ and $O_3$ at 100° C., 40° C., −15° C., −20° C. and −30° C., and the VIE value was determined by introducing into these oils a proportion of 9% by weight of the various copolymers 1 to 17, prepared and defined as shown above.

A first set of measurements was performed with oil $O_1$ by employing the copolymers 1 to 4.

The results are shown in Table III below.

TABLE III

| | Kinematic viscosity of $O_1$ (mm²/s) | | | |
|---|---|---|---|---|
| Copolymer (No.) | 100° C. | 40° C. | −30° C. | VIE |
| 1 (comparative) | 6.56 | 31.7 | 4210 | 168 |
| 2 (comparative) | 6.19 | 26.7 | 4210 | 193 |
| 3 (comparative) | 6.75 | 32.4 | 7970 | 173 |
| 4 (invention) | 6.69 | 30.6 | 3850 | 185 |

The examination of the results assembled in Table III shows that, by virtue of the copolymers in accordance with the invention, the viscosity at very low temperatures is markedly improved and is, in particular, found to be lower than 4000 mm²/s at −30° C. (this value of 4000 at very low temperatures constituting an upper limit for the kinematic viscosity according to the oil manufacturers' specifications).

A second set of measurements was performed with oil $O_2$ employing the copolymers 5 to 10.

The results are shown in Table IV below.

TABLE IV

| | Kinematic viscosity of $O_2$ (mm²/s) | | | |
|---|---|---|---|---|
| Copolymer (No.) | 100° C. | 40° C. | −30° C. | VIE |
| 5 (invention) | 6.58 | 29.0 | 3370 | 193 |
| 6 (comparative) | 6.54 | 29.5 | 4000 | 186 |
| 7 (invention) | 6.42 | 28.6 | 3330 | 188 |
| 8 (invention) | 6.82 | 30.5 | 3540 | 193 |
| 9 (comparative) | 6.58 | 29.5 | 4050 | 185 |
| 10 (comparative) | 6.64 | 31.2 | 4150 | 177 |

The examination of the results assembled in Table IV shows that, by virtue of the copolymers in accordance with the invention, the viscosity at very low temperatures is markedly improved and is, in particular, found to be lower than 4000 mm²/s at −30° C.

A third set of measurements was performed with oil $O_3$ employing the copolymers 11 to 17.

The results are shown in Table V.

TABLE V

| Copolymer (No.) | Kinematic viscosity of $O_3$ (mm²/s) | | | | VIE |
|---|---|---|---|---|---|
| | 100° C. | 40° C. | −15° C. | −20° C. | |
| 11 (comparative) | 9.43 | 55.6 | 2450 | 4860 | 153 |
| 12 (comparative) | 8.94 | 47.9 | 5400 | 10070 | 170 |
| 13 (invention) | 9.62 | 54.9 | 2060 | 3910 | 161 |
| 14 (invention) | 9.57 | 54.4 | 2070 | 3910 | 162 |
| 15 (invention) | 9.56 | 53.1 | 1990 | 3750 | 166 |
| 16 (invention) | 9.57 | 55.3 | 2040 | 3850 | 158 |
| 17 (invention) | 9.46 | 53.9 | 1990 | 3960 | 160 |

The examination of the results assembled in Table V shows that by virtue of copolymers in accordance with the invention, the viscosity at very low temperatures is markedly improved and is, in particular, found to be lower than 4000 mm²/s at −15° C. and at −20° C.

As a result thereof, copolymers of unsaturated fatty esters of the kind in question are available, whose constitution results sufficiently from the above to make it unnecessary to dwell further on this subject, and which exhibit many advantages in relation to those which already exist, especially that of imparting to the lubricating oils into which they are incorporated properties which are extremely valuable from the viewpoint of kinematic viscosity at very low temperatures.

What is claimed is:

1. A copolymer comprising carboxylic acid ester comprising a percentage $\underline{a}$ by mass of an ester of a carboxylic acid $A_1$ containing from 3 to 5 carbon atoms and exhibiting an ethylenic unsaturation alpha to the carboxylic functional group, with an alcohol of formula $R_1OH$ containing from 1 to 3 carbon atoms;

a percentage $\underline{b}$ by mass of an ester of a carboxylic acid $A_2$ containing from 3 to 5 carbon atoms and exhibiting an ethylenic unsaturation alpha to the carboxylic functional group, with an alcohol of formula $R_2OH$ containing on average from 11 to 15 carbon atoms; and a percentage $\underline{c}$ by mass of an ester of a carboxylic acid $A_3$ containing from 3 to 5 carbon atoms and exhibiting an ethylenic unsaturation alpha to the carboxylic functional group, with an alcohol of formula $R_3OH$ containing on average from 16 to 25 carbon atoms in which a is between about 12 and about 20%, c is between about 14 and about 30% and b is between about 72 and about 45%, such that a + b+c=100%.

2. The copolymers as claimed in claim 1, having a weight-average molecular mass $\overline{M}w$ of between about 70,000 and about 90,000 g/mole and which exhibit a polydispersity value $\overline{M}w/\overline{M}n$ of between 2 and 5.

3. The copolymer of claim 1 wherein the alcohol $R_1OH$ contains 1 or 2 carbon atoms.

4. The copolymer of claim 3 wherein the alcohol $R_1OH$ is methyl alcohol.

5. The copolymer of claim 1 wherein the alcohol $R_2OH$ contains from about 12 to about 14 carbon atoms.

6. The copolymer of claim 1 wherein the alcohol $R_3OH$ contains from about 15 to about 20 carbon atoms.

7. The copolymer of claim 6 wherein the alcohol $R_3OH$ contains from about 16 to about 18 carbon atoms.

8. The copolymer of claim 2 having a weight average molecular mass $\overline{M}w$ of between about 80,000 and about 85,000 g/mole.

9. The copolymer of claim 2 wherein the polydispersity value $\overline{M}w/\overline{M}n$ is from about 2 to about 3.

10. A copolymer prepared by reacting in an organic diluent, a percentage $\underline{a}$ by mass of an ester of a carboxylic acid $A_1$ containing from 3 to 5 carbon atoms and exhibiting an ethylenic unsaturation alpha to the carboxylic functional group, with an alcohol of formula $R_1OH$ containing from 1 to 3 carbon atoms;

a percentage $\underline{b}$ by mass of an ester of a carboxylic acid $A_2$ containing from 3 to 5 carbon atoms and exhibiting an ethylenic unsaturation alpha to the carboxylic functional group, with an alcohol of formula $R_2OH$ containing on average from 11 to 15 carbon atoms:and a percentage $\underline{c}$ by mass of an ester of a carboxylic acid $A_3$ containing from 3 to 5 carbon atoms and exhibiting an ethylenic unsaturation alpha to the carboxylic functional group, with an alcohol of formula $R_3OH$ containing on average from 16 to 25 carbon atoms in which a is between about 12 and about 20%, c is between about 14 and about 30% and b is between about 72 and about 45%, such that a + b+c=100%.

11. The copolymer of claim 10 prepared employing a free-radical initiator.

12. The copolymer of claim 10 prepared in a mineral oil solvent.

13. The copolymer of claim 12 wherein the mineral oil is an oil of lubricating viscosity.

14. A composition comprising from about 25% to about 75% by weight of the copolymer of claim 1 and the balance comprising a normally liquid organic diluent.

15. The composition of claim 14 wherein the normally liquid organic diluent comprises mineral oil.

16. A composition comprising from about 25% to about 75% by weight of the copolymer of claim 10 and the balance comprises a normally liquid organic diluent.

17. The composition of claim 16 wherein the normally liquid organic diluent comprises mineral oil.

18. A lubricating oil composition comprising a major amount of an oil of lubricating viscosity and from about 2 to about 20% by weight of the copolymer of claim 1.

19. A lubricating oil composition comprising a major amount of an oil of lubricating viscosity and from about 2 to about 20% by weight of the copolymer of claim 10.

20. A partially naphthenic lubricating oil composition comprising at least one copolymer as claimed in claim 1 in a proportion of from about 2 to about 20% by weight of the mass of lubricating oil to be treated, said copolymer being such that a is between about 12 and about 20%, c is between about 14 and about 25%, and b is between about 72 and about 45%, such that a+b+c=100%.

21. A partially naphthenic lubricating oil composition comprising at least one copolymer as claimed in claim 10 in a proportion of from about 2 to about 20% by weight of the mass of lubricating oil to be treated, said copolymer being such that a is between about 12 and about 20% c is between about 14 and about 25%, and b is between about 72 and about 45%, such that a+b+c=100%.

22. A paraffinic lubricating oil which comprises at least one copolymer as claimed in claim 1 in a proportion of from about 2 to about 20% by weight of the mass of lubricating oil to be treated, said copolymer being such that c and b are between about 14 and about 30% and between about 72 and about 53% respectively, a being between about 12 and about 25% with a+ b+ c=100%.

23. A paraffinic lubricating oil which comprises at least one copolymer as claimed in claim 10 in a proportion of from about 2 to about 20% by weight of the mass of lubricating oil to be treated, said copolymer being such that c and b are between about 14 and about 30% and between about 72 and about 53% respectively, a being between about 12 and about 20% with a+b+c=100%.

* * * * *